United States Patent
Willems et al.

(10) Patent No.: US 12,032,575 B2
(45) Date of Patent: *Jul. 9, 2024

(54) QUERY EXECUTION INCLUDING PAUSE AND DETACH OPERATIONS AFTER FIRST DATA FETCH

(71) Applicant: SAP SE, Walldorf (DE)

(72) Inventors: Paul Willems, Heidelberg (DE); Christina Teflioudi, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,210

(22) Filed: Mar. 10, 2023

(65) Prior Publication Data
US 2023/0214393 A1 Jul. 6, 2023

Related U.S. Application Data (63) Continuation of application No. 16/370,580, filed on Mar. 29, 2019, now Pat. No. 11,625,401.

(51) Int. Cl.
*G06F 16/00* (2019.01)
*G06F 16/2455* (2019.01)
*G06F 16/248* (2019.01)
*H04L 67/01* (2022.01)

(52) U.S. Cl.
CPC ........ *G06F 16/2455* (2019.01); *G06F 16/248* (2019.01); *H04L 67/01* (2022.05)

(58) Field of Classification Search
CPC ... G06F 16/2455; G06F 16/248; H04L 67/01; H04L 67/1001; H04L 67/1091; H04L 67/1097
USPC .................................................. 707/600–899
See application file for complete search history.

(56) References Cited

U.S. PATENT DOCUMENTS

| | | | |
|---|---|---|---|
| 6,640,244 B1* | 10/2003 | Bowman-Amuah | ... G06F 9/466 707/999.01 |
| 11,663,205 B2* | 5/2023 | Levine | ... G06F 16/252 707/713 |
| 2004/0172385 A1* | 9/2004 | Dayal | ............... G06F 16/24561 |
| 2015/0324382 A1 | 11/2015 | Seufert et al. | |

* cited by examiner

*Primary Examiner* — Irete F Ehichioya
*Assistant Examiner* — Shirley D Hicks
(74) *Attorney, Agent, or Firm* — Mintz Levin Cohn Ferris Glovsky and Popeo, P.C.

(57) ABSTRACT

Aspects of the current subject matter are directed to providing query results to clients by incorporating pause and/or detach operations into the query execution after a first fetch of results. The pause and the detach operations for query execution consistent with implementations of the current subject matter result in reduced times and conserved resources in providing query results by computing only results necessary to satisfy a first fetch call prior to computing results necessary to satisfy subsequent fetch calls.

20 Claims, 5 Drawing Sheets

QUERY EXECUTION INCLUDING PAUSE AND DETACH OPERATIONS AFTER FIRST DATA FETCH

CROSS REFERENCE TO RELATED APPLICATION

This application is a continuation of U.S. patent application Ser. No. 16/370,580 filed on Mar. 29, 2019, entitled "QUERY EXECUTION INCLUDING PAUSE AND DETACH OPERATIONS AFTER FIRST DATA FETCH". The entire contents of this application is incorporated herein by reference in its entirety.

FIELD

The present disclosure generally relates to database management and, more specifically, to query execution on database tables.

BACKGROUND

Database management systems have become an integral part of many computer systems. For example, some systems handle hundreds if not thousands of transactions per second. Some systems perform very complex multidimensional analysis on data. In both cases, the underlying databases may need to handle responses to queries very quickly in order to satisfy systems requirements with respect to transaction time. Given the complexity of these queries and/or their volume, the underlying databases face challenges in optimizing performance.

SUMMARY

Methods, systems, and articles of manufacture, including computer program products, are provided for executing queries by incorporating pause and/or detach operations into the query execution after a first fetch of results.

According to aspects of the current subject matter, a computer-implemented method may include: receiving, at a database execution engine and from a client, a query including a request for data; determining, by the database execution engine, a timing schedule to compute a second subset of results following computation of a first subset of results, where the first subset of results includes a first portion of the data to satisfy the query, and where the second subset of results includes a second portion of the data to satisfy the query; computing, by the database execution engine, the first subset of results; providing, by the database execution engine and to the client, the first subset of results; computing, by the database execution engine and based on the determined timing schedule, the second subset of results; and providing, by the database execution engine and to the client in response to a client fetch request, the second subset of results.

In an inter-related aspect, a system includes at least one data processor, and at least one memory storing instructions which, when executed by the at least one data processor, result in operations including: receiving, from a client, a query including a request for data; determining a timing schedule to compute a second subset of results following computation of a first subset of results, where the first subset of results includes a first portion of the data to satisfy the query, and where the second subset of results includes a second portion of the data to satisfy the query; computing the first subset of results; providing, to the client, the first subset of results; computing, based on the determined timing schedule, the second subset of results; and providing, to the client in response to a client fetch request, the second subset of results.

In an inter-related aspect, a non-transitory computer-readable storage medium includes program code, which when executed by at least one data processor, causes operations including: receiving, at a database execution engine and from a client, a query including a request for data; determining, by the database execution engine, a timing schedule to compute a second subset of results following computation of a first subset of results, where the first subset of results includes a first portion of the data to satisfy the query, and where the second subset of results includes a second portion of the data to satisfy the query; computing, by the database execution engine, the first subset of results; providing, by the database execution engine and to the client, the first subset of results; computing, by the database execution engine and based on the determined timing schedule, the second subset of results; and providing, by the database execution engine and to the client in response to a client fetch request, the second subset of results.

In some variations, one or more of the features disclosed herein including the following features can optionally be included in any feasible combination. The timing schedule may be predefined for the client and/or the database execution engine. The timing schedule may be based on a capacity of the database execution engine, an amount of the data needed to satisfy the query, and/or a timing requirement of the client. The second subset of results may be computed in response to the client fetch request. The second subset of results may be computed during a time in which the first subset of results are provided to the client. A separate thread may be utilized to compute the second subset of results, where the second subset of results are stored in a memory buffer, and where the separate thread is different from a thread used to compute and provide the first subset of results. The database execution engine may compute, based on the determined timing schedule, a subsequent subset of results following the second subset of results; and the database execution engine may provide, to the client in response to a subsequent client fetch request, the subsequent subset of results.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Aspects of the current subject matter are directed to providing query results to clients by incorporating pause and/or detach operations into the query execution after a first fetch of results. The pause and detach operations for query execution consistent with implementations of the current subject matter result in reduced times and conserved resources in providing query results.

For example, in a data request query from a client to a server, the client may send an "open" request to initiate the query, followed by one or more "fetch" requests to receive results until all results are received. At that point, the client may close the query. Query execution for this process is typically done in the same thread which receives the open and fetch requests. This may result in the server computing a full query result in response to the initial open request. This is a time intensive process in which server resources are expended prior to results being required, thus opening up a possibility of wasting resources. For example, in some instances, the client may choose not to send one or more fetch requests to obtain all results. But as the server has computed the full query result, the server has clearly wasted processing resources by computing the full query result at the onset of the open request. Moreover, from the client's perspective, the computation of the full query result leads to extra time during which the client is waiting for the first fetch result.

Implementations of the current subject matter provide for query execution that incorporates operations to decrease delay in which query results are provided (the first fetch result as well as the overall elapsed time of the query) while also conserving server resources. Additional details are provided herein.

Database management systems and operations performed on data managed by a database management system have become increasingly complex. For example, a database management system (or database for short) may support relatively complex online analytical processing (OLAP, which may perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various database layer differences, the queries performed at a database may include a complex sequence of operations to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

Consistent with implementations of the current subject matter, an execution engine is provided that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which may be executed at runtime. The executable code may include pre-compiled code (which may be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein may perform query execution for a variety of database types and send queries to the different types of database layers (and/or their storage/persistence layer) and handle the corresponding responses.

Figure 1:
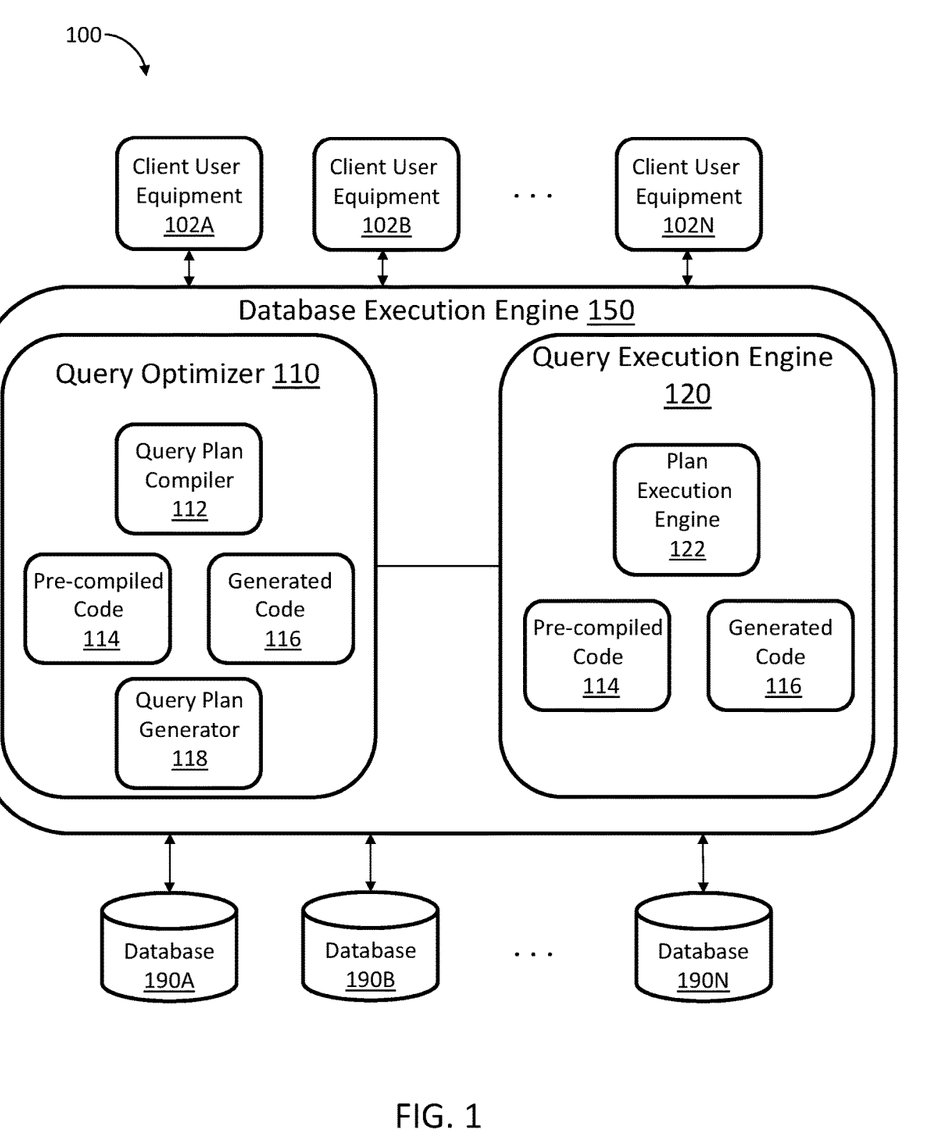
FIG. 1 is a block diagram illustrating a system architecture in which implementations of the current subject matter may be employed.

FIG. 1 depicts an example of a system 100 in which implementations of the current subject matter may be employed.

The system 100 may include one or more client user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A-N represent the database layer of a database management system where data may be persisted and/or stored in a structured way, and where the data may be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at the database layer 190A-N, for example.

A query plan compiler 112 may enable compilation of some, if not all, of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some implementations, the query optimizer 110 may optimize the query plan by compiling and generating code. Moreover, the query optimizer 110 may optimize the query plan to enable pipelining during execution.

The query execution engine 120 may receive, from the query plan generator 118, compiled code to enable execution of the optimized query plan, although the query execution engine 120 may also receive code or other commands directly from a higher-level application or other device, such as user equipment 102A-N.

The code 114, 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of databases layers 190A-N.

In some implementations, the query execution engine 120 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 120 may perform execution related to handling the differences between these two types of databases. This may enable a reduction in processing at the database layer 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the database's persistence/storage layer 190A-N can perform simpler operations to reduce the processing burden at the database's persistence/storage layer 190A-N.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database execution engine 150 is one example of an engine (e.g., a server) that may be utilized for providing query results to clients consistent with implementations of the current subject matter.

Implementations of the current subject matter are directed to providing query results to clients by incorporating pause and/or detach operations into the query execution after a first fetch of results. The pause and the detach operations for query execution consistent with implementations of the current subject matter result in reduced times and conserved resources in providing query results by computing only results necessary to satisfy a first fetch call prior to computing results necessary to satisfy subsequent fetch calls. The pause operations and the detach operations may be implemented by, for example, the database execution engine 150 in response to a query from a client user equipment 102A-N, as described with reference to FIG. 1.

The pause operation consistent with implementations of the current subject matter includes, in response to an open request to initiate a query by a client user equipment 102, computing by the database execution engine 150 a first subset or batch of results to satisfy the open request, sending the first subset of results to the client user equipment 102, and waiting for a subsequent fetch request from the client user equipment 102 prior to computing a second subset of results. If and when the subsequent fetch request is received, the database execution engine 150 then computes the second subset of results. Additional fetch requests from the client user equipment 102 and results from the database execution engine 150 may be incorporated. The pause operation consistent with implementations of the current subject matter provides a faster response time (i.e., the time until the first result is received by the client user equipment 102). Moreover, the pause operation results in resources being saved until they are needed, which may be especially beneficial in instances in which the client user equipment 102 fails to send one or more fetch results after the open request. Furthermore, the pause operation eliminates a need to buffer results, which also requires resources of the database execution engine 150.

The detach operation consistent with implementations of the current subject matter includes, in response to an open request to initiate a query by a client user equipment 102, computing by the database execution engine 150 a first subset or batch of results to satisfy the open request and sending the first subset of results to the client user equipment 102. The database execution engine 150 then asynchronously computes the second subset of results. The asynchronous query execution is done on a separate thread (i.e., detached from the main line of execution), while the thread that received the open request returns the first subset of results. If and when a subsequent fetch request is sent by the client user equipment 102, the database execution engine 150 provides the computed second subset of results from a shared memory buffer which is filled by the asynchronously running query execution. The detach operation consistent with implementations of the current subject matter provides for a faster response time (i.e., the time until the first result is received by the client user equipment 102). Furthermore, the detach operation results in reducing overall elapsed time of the query execution due to the computation time of the database execution engine 150 being overlaid with transfer times and reaction times by the client user equipment 102 (i.e., during the asynchronous running of the query execution).

The pause operation and the detach operation consistent with implementations of the current subject matter define a timing schedule indicating when a second subset of results should be computed following computation of the first subset of results. As described with reference to the pause operation, the timing schedule dictates that the database execution engine 150 should wait to compute the second (and subsequent) subset of results in response to receiving a fetch request from the client user equipment 102. The timing schedule for the detach operation dictates that the database execution engine 150 should compute the second (and subsequent) subset of results using a separate thread when the first subset of results is computed and is being sent.

Consistent with implementations of the current subject matter, content and/or an amount of the first subset of results and content and/or an amount of the second and subsequent subsets of results may be, for example in some implementations, client protocol-dependent. The content and/or amount may be dependent on the query and the overall data size of the result. Alternatively and/or additionally the content and/or amount may be dependent on current resources of the database execution engine 150. In some implementations, a number of results to include in the first subset of results may be determined on the server (i.e., the database execution engine 150) side. In other implementations, a number of results to include in the first subset of results may be included as part of the open request by the client user equipment 102.

Figure 2A:
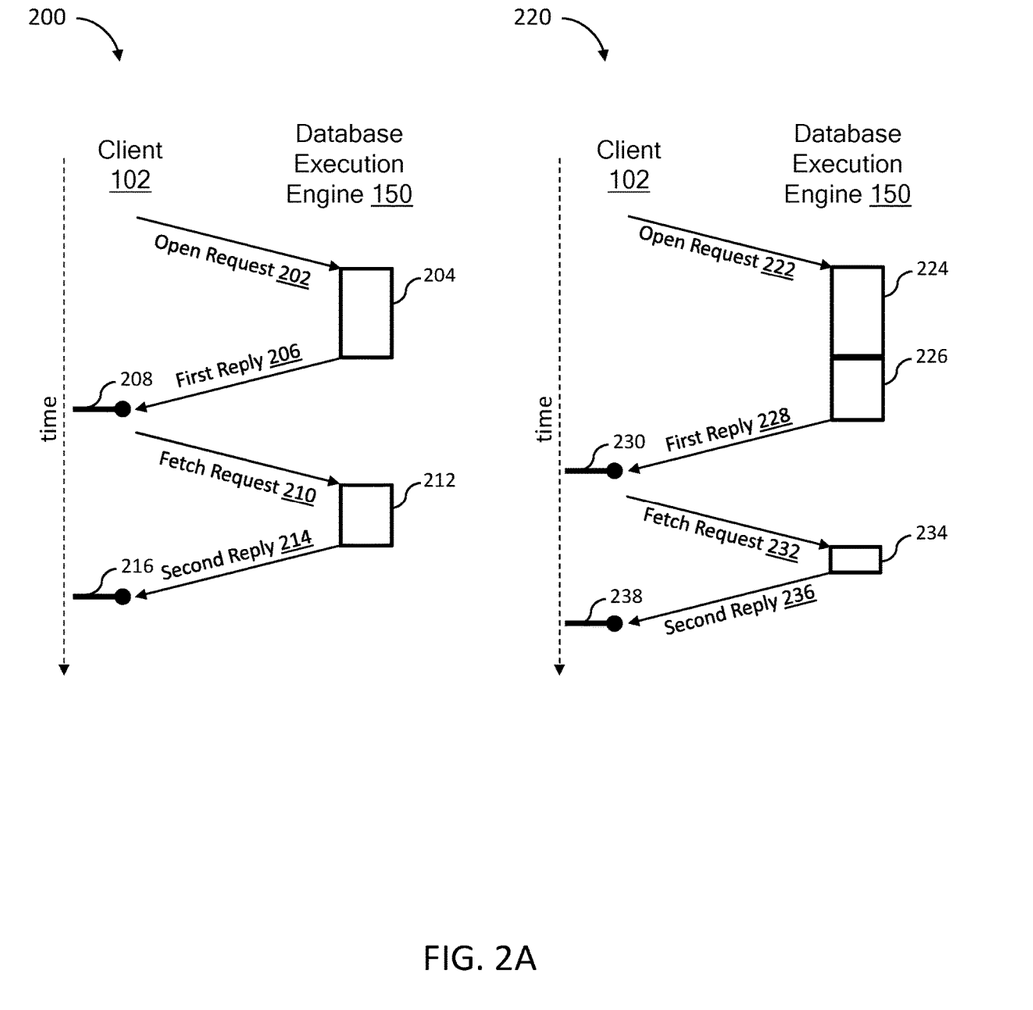
FIGS. 2A and 2B are representations of query executions consistent with implementations of the current subject matter.
Figure 2B:
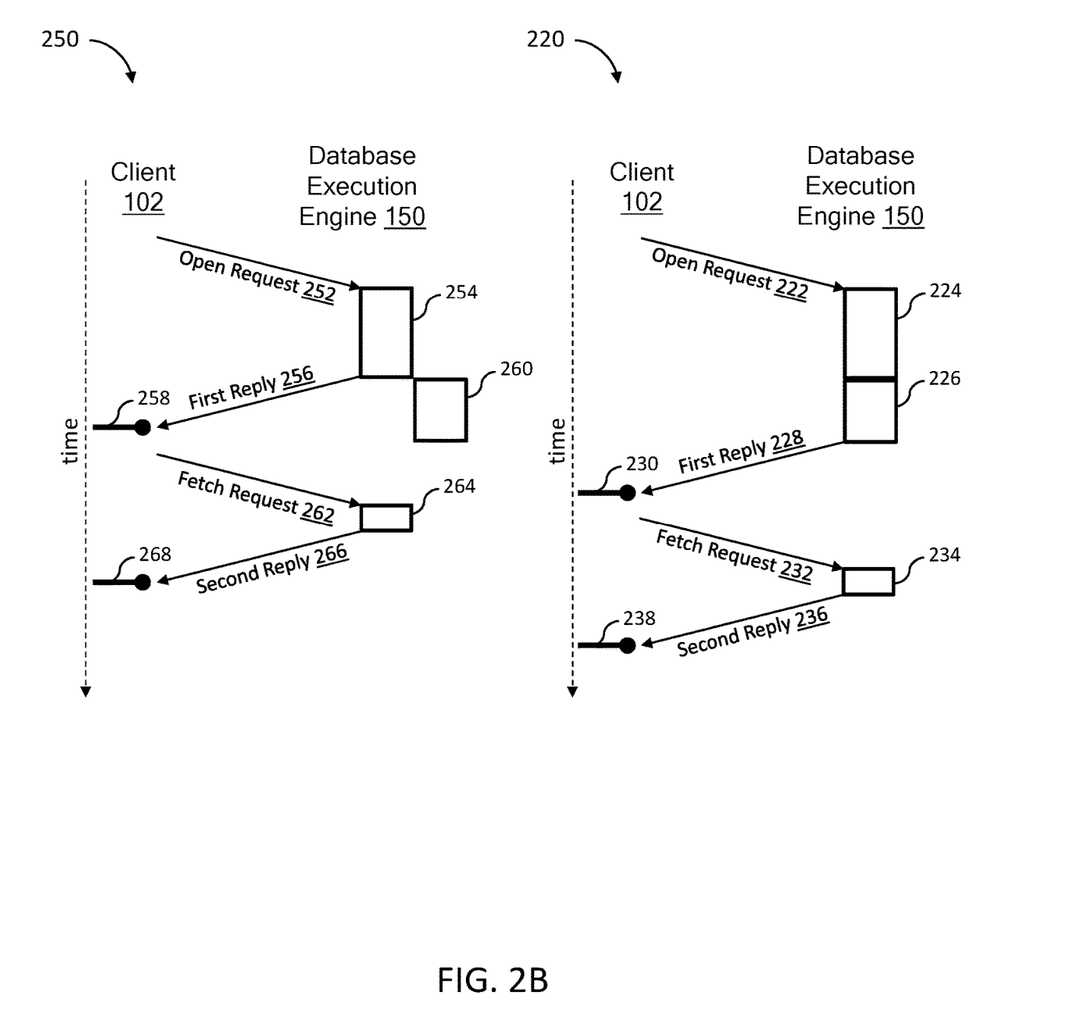

FIGS. 2A and 2B are representations of query requests and query executions between the client user equipment 102 and the database execution engine 150 consistent with implementations of the current subject matter. FIGS. 2A and 2B illustrate the timing schedule for the pause operation and the detach operation, respectively.

FIG. 2A illustrates aspects related to the pause operation consistent with implementations of the current subject matter. A sequence 200 illustrates the pause operation, and a sequence 220 illustrates a standard data request query and execution to emphasize timing differences provided by the pause operation consistent with implementations of the current subject matter.

With reference to the sequence 200, an open request 202 is sent by the client user equipment 102 to the database execution engine 150. In response to the open request 202, the database execution engine 150 computes a first subset or batch of results 204 (where 204 represents an amount of time needed to compute the first subset of results). The first subset of results 204 are sent to the client user equipment 102 in a first reply 206, which are received by the client user equipment 102 at a first time 208. During this time, the database execution engine 150 waits for a subsequent fetch request without utilizing additional resources. The client user equipment 102 may later send a fetch request 210. In response to the fetch request 210, the database execution engine 150 computes a second subset or batch of results 212 (where 212 represents an amount of time needed to compute the second subset of results). The second subset of results 212 are sent to the client user equipment 102 in a second reply 214, received by the client user equipment at a second time 216. As noted, additional fetch requests from the client user equipment 102 and results from the database execution engine 150 may be incorporated.

Comparing the sequence 200 of the pause operation consistent with implementations of the current subject matter, sequence 220 illustrates a standard data request query sent from the client user equipment 102 to the database execution engine 150. An open request 222 is sent to and received by the database execution engine 150. The database execution engine 150 computes a full query result that includes, for example, a first subset of results 224 (where 224 represents an amount of time needed to compute the first subset of results which is equivalent to 204 in the pause operation sequence 200) to satisfy the open request 222 and a second subset of results 226 to satisfy subsequent fetch requests. The first subset of results 224 are sent to the client user equipment 102 in a first reply 228, which are received by the client user equipment 102 at a first time 230. The client user equipment 102 may later send a fetch request 232. In response to the fetch request 232, the database execution engine 150 obtains the second subset of results 226 (where 226 represents an amount of time needed to compute the second subset of results, which is equivalent to 212 in the pause operation sequence 200) from a shared memory buffer 234 (where 234 represents an amount of time needed to copy the second subset of results 226 from the shared memory buffer). The second subset of results 226 are sent to the client user equipment 102 in a second reply 236, received by the client user equipment at a second time 238. As noted, additional fetch requests from the client user equipment 102 and results from the database execution engine 150 may be incorporated.

The first times 208 and 230 thus are the times at which the first subset of results to satisfy the user query are received using the pause operation and a standard operation, respectively. As can be seen in FIG. 2A, the pause operation (sequence 200) provides the first subset of results 204 in a shorter amount of time than that provided by the standard operation (220). Additionally, the pause operation provides the second subset of results 212 in a shorter amount of time than that provided by the standard operation. Moreover, the total amount of time to receive the full query result is less using the pause operation.

FIG. 2B illustrates aspects related to the detach operation consistent with implementations of the current subject matter. A sequence 250 illustrates the detach operation, and the sequence 220 illustrates the standard data request query and execution to emphasize timing differences provided by the detach operation consistent with implementations of the current subject matter.

With reference to the sequence 250, an open request 252 is sent by the client user equipment 102 to the database execution engine 150. In response to the open request 252, the database execution engine 150 computes a first subset or batch of results 254 (where 254 represents an amount of time needed to compute the first subset of results, which is equivalent to 224 in the standard operation sequence 220). The first subset of results 254 are sent to the client user equipment 102 in a first reply 256, which are received by the client user equipment 102 at a first time 258. Once the first subset of results 254 are computed and sent, the database execution engine 150 then asynchronously computes the second subset of results 260 (where 260 represents an amount of time needed to compute the second subset of results, which is equivalent to 226 in the standard operation sequence 220). The asynchronous query execution is done on a separate thread (i.e., detached from the main line of execution), while the thread that received the open request 252 returns the first subset of results 254 (i.e., the first reply 256). The client user equipment 102 may later send a fetch request 262. In response to the fetch request 262, the database execution engine 150 obtains the second subset of results 260 from a shared memory buffer 264 (where 264 represents an amount of time needed to copy the second subset of results 260 from the shared memory buffer). The second subset of results 260 are sent to the client user equipment 102 in a second reply 266, received by the client user equipment at a second time 268.

The first times 258 and 230 thus are the times at which the first subset of results to satisfy the user query are received using the detach operation and the standard operation, respectively. As can be seen in FIG. 2B, the detach operation (sequence 250) provides the first subset of results 254 in a shorter amount of time than that provided by the standard operation (220). Additionally, the detach operation provides the second subset of results 260 in a shorter amount of time than that provided by the standard operation. Moreover, the total amount of time to receive the full query result is less using the detach operation.

The pause operation and the detach operation may be alternatives to one another, consistent with some implementations of the current subject matter. In other instances, the pause operations and the detach operations may both be utilized. The pause operation and/or the detach operation may be established as settings for one or more of a particular client user equipment 102A-N or for the database execution engine 150. For example, for the client user equipment 102A, the pause operation may be established and applied, while for the client user equipment 102B, the detach operation may be established and applied. In other instances, consistent with implementations of the current subject matter, use of the pause operation and/or the detach operation may be set by the database execution engine 150.

In additional implementations, in determining whether to utilize the pause operation and/or the detach operation, certain factors may be considered. For example, in determining which of the pause operation or the detach operation to utilize, aspects of the query and/or the database execution engine 150 may be analyzed to select a particular operation. For example, if the database execution engine 150 is currently handling a large load or number of queries, the pause operation may be selected due to resources being spaced apart in implementation of the pause operation (i.e., a first subset of results being computed and sent, and then the database execution engine 150 waiting to compute the second subset of results based on a subsequent fetch request from the client user equipment 102). Factors to identify that the database execution engine 150 is overloaded may include for example a number of queries currently at the database execution engine 150 and/or a size of data required to execute the number of queries. If the number of queries is greater than a predetermined amount and/or if the size of data required to execute the number of queries exceeds a predetermined size, then the pause operation may be selected over the detach operation. If the number of queries is less than the predetermined amount and/or if the size of data required to execute the number of queries is less than the predetermined size, then the detach operation may be selected over the pause operation. Factors related to timing may also be considered. For example, as the detach operation may result in providing the full query result more quickly, the detach operation may be used when time is indicated to be an important factor (e.g., as indicated by the client user equipment 102). Other factors and/or considerations may also be utilized, where the factors and/or considerations are related to, for example, processing capability of the database execution engine 150.

Aspects of the pause operation and the detach operation may be combined for query execution consistent with implementations of the current subject matter. For example, in handling a query requiring multiple fetch requests for the full query result, the detach operation may be used first to provide first and second subsets of results, followed by the pause operation to provide third and subsequent results. Alternatively, the pause operation could be employed first. Various combinations of the pause and detach operations may be utilized. Timing and factors related to the query and/or the database execution engine 150 may be utilized to determine the combination of operations. For example, load, processing capabilities, and data sizes may be taken into consideration. Factors related to the client user equipment 102, for example timing and behavior of the client user equipment 102 (how fast it fetches and/or whether is fetches at all), may also be relevant.

Figure 3:
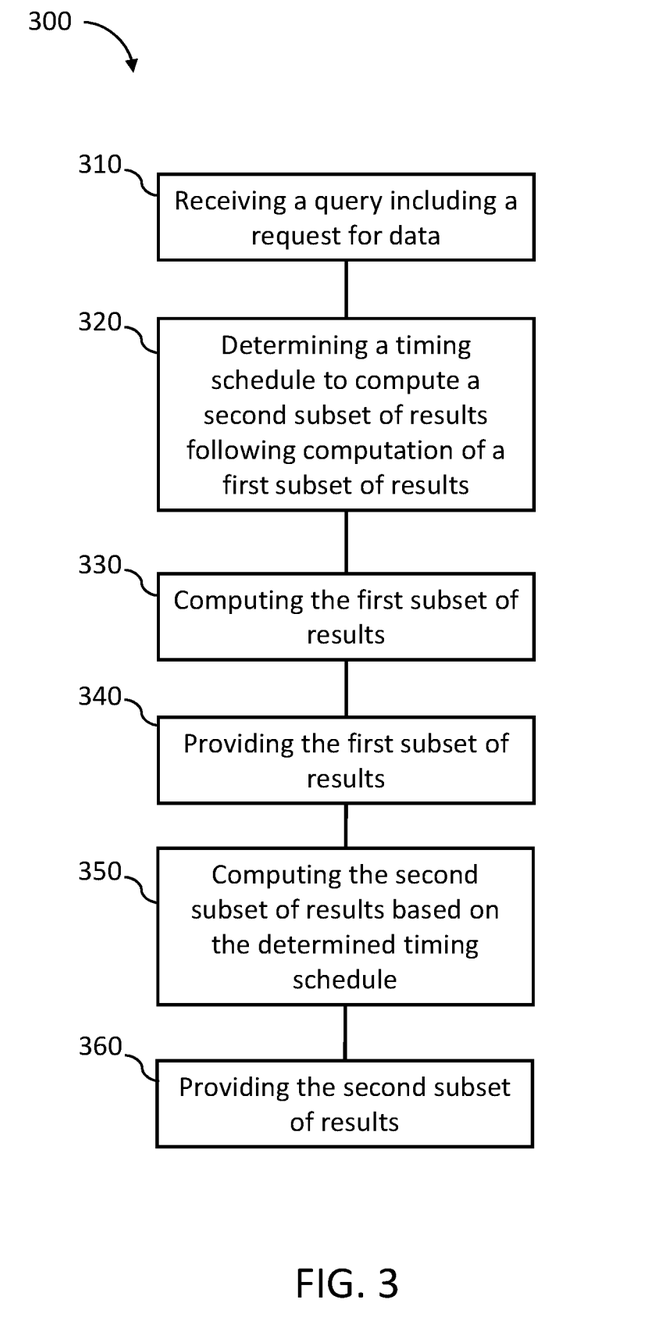
FIG. 3 depicts a flowchart illustrating a process for executing queries consistent with implementations of the current subject matter.

FIG. 3 depicts a flowchart 300 illustrating a process for query execution consistent with implementations of the current subject matter.

At 310, the database execution engine 150 receives from the client user equipment 102 a query. The query may include a request for data to be provided to the client user equipment 102.

At 320, the database execution engine 150 determines a timing schedule to use for computing a second subset of results following computation of a first subset of results. That is, the database execution engine 150 may determine if the pause operation consistent with implementations of the current subject matter should be used or if the detach operation consistent with implementations of the current subject matter should be used. The determination may also include identifying that a combination of the pause and detach operations should be used. The timing schedule may be predefined for the client user equipment 102 and/or for the database execution engine 150. For example, a particular client user equipment may require one or the other of the pause operation or the detach operation. In other implementations, the timing schedule may be based on a capacity of the database execution engine 150, an amount of the data needed to satisfy the query, and/or a timing requirement of the client user equipment 102.

At 330, the database execution engine 150 computes the first subset of results. For example, the database execution engine 150 may obtain a first portion of the data to satisfy the query. At 340, the database execution engine 150 provides the first subset of results to the client user equipment 102. For example, the first portion of the data may be provided to the client user equipment 102 via an interface that allows for the client user equipment 102 to obtain the results.

At 350, the second subset of results are computed by the database execution engine consistent with the determined timing schedule. For example, if the timing schedule is indicative of the pause operation, the second subset of results are computed in response to a client fetch request. If the timing schedule is indicative of the detach operation, the second subset of results are computed during a time in which the first subset of results are being provided to the client user equipment 102. The detach operation utilizes a separate thread to compute the second subset of results and stores the second subset of results in a memory buffer. The second subset of results may include a second portion of the data to satisfy the query.

At 360, the database execution engine 150 provides the second subset of results to the client user equipment 102. The provision of the second subset of results may be in response to a client fetch request. For example, the client user equipment 102 may send one or more fetch results until the desired results or the full query result is obtained from the database execution engine 150. The second subset of results, which may include the second portion of the data, may be in response to the client fetch request.

Consistent with additional implementations of the current subject matter and as described further herein, the database execution engine 150 may compute subsequent subsets of results based on the determined timing schedule. The subsequent subsets of results may be provided to the client user equipment 102 in response to subsequent fetch requests to obtain the full query result. The determined timing schedule may be used to identify if the database execution engine 150 should wait for subsequent fetch requests before computing the subsets or if the subsets should be computed using a separate thread during when the first subset of results are being sent.

Figure 4:
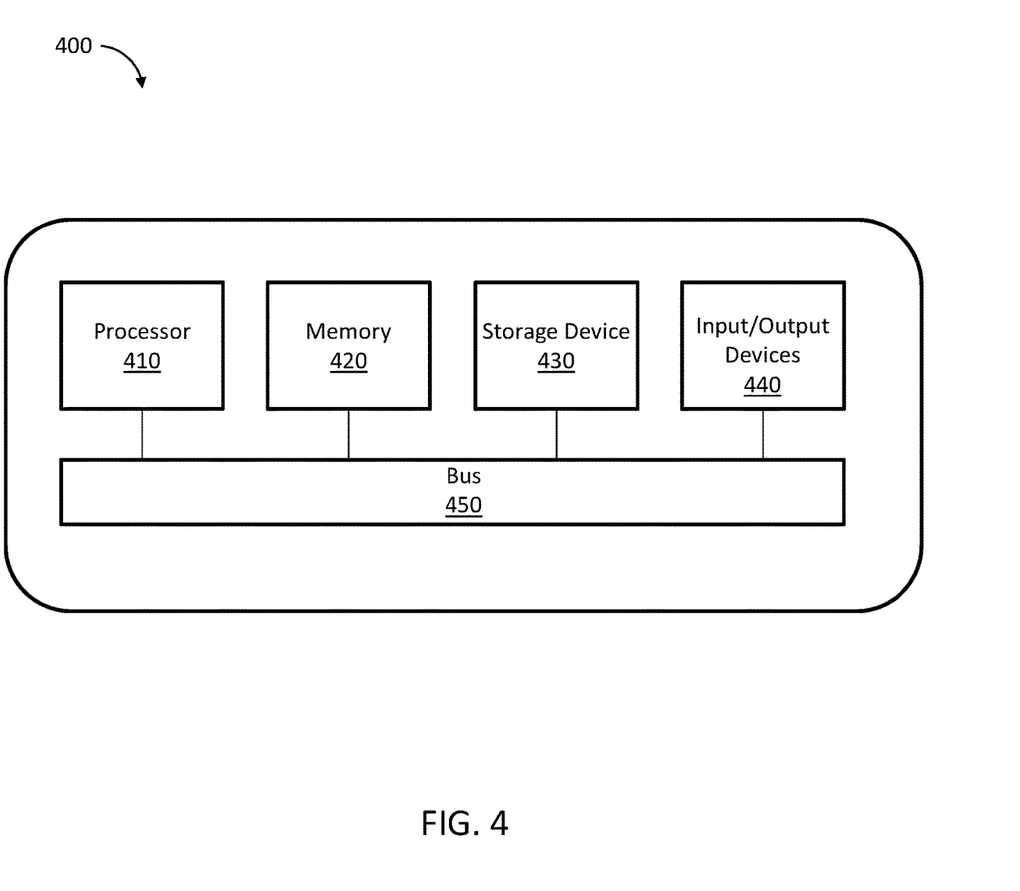
FIG. 4 depicts a block diagram illustrating a computing system consistent with implementations of the current subject matter.

FIG. 4 depicts a block diagram illustrating a computing system 400 consistent with implementations of the current subject matter. Referring to FIG. 1, the computing system 400 can be used to implement the system 100 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 100. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
   determining, by a database execution engine, a timing schedule to compute a second subset of results following computation of a first subset of results, the first subset of results comprising a first portion of data to satisfy a query, the second subset of results comprising a second portion of the data to satisfy the query, the determined timing schedule providing for use of a pause operation or a detach operation to compute the second subset of results, the pause operation waiting for a subsequent fetch request prior to computing the second subset of results, the detach operation asynchronously computing the second subset of results in a second thread different from a first thread used for the first subset of results;
   computing, by the database execution engine and based on the pause operation or the detach operation determined by the timing schedule, the second subset of results; and
   providing, by the database execution engine, the second subset of results.

2. The computer-implemented method of claim 1, wherein when the timing schedule indicates the database execution engine is handling a quantity of queries exceeding a threshold amount, the pause operation is selected, and wherein when the timing schedule indicates the database execution engine is handling a quantity of queries less than the threshold amount, the detach operation is selected.

3. The computer-implemented method of claim 1, further comprising:
   receiving, by the database execution engine and from a client, the query comprising a request for the data, and wherein prior to computing the second subset of results, the computer-implemented method further comprising:
      computing, by the database execution engine, the first subset of results.

4. The computer-implemented method of claim 3 further comprising:
   providing, by the database execution engine, the first subset of results.

5. The computer-implemented method of claim 4, wherein the second subset of results are computed during a time in which the first subset of results are provided to the client.

6. The computer-implemented method of claim 3, wherein the timing schedule is determined based on a timing requirement of the client.

7. The computer-implemented method of claim 1, wherein the timing schedule is determined based on a capacity of the database execution engine.

8. The computer-implemented method of claim 1, wherein the timing schedule is determined based on an amount of the data needed to satisfy the query.

9. The computer-implemented method of claim 1, wherein the second subset of results are computed in response to a client fetch request.

10. The computer-implemented method of claim 1, wherein a separate thread is utilized to compute the second subset of results, and wherein the separate thread is different from a thread used to compute and provide the first subset of results.

11. A system, comprising:
at least one data processor; and
at least one memory storing instructions which, when executed by the at least one data processor, result in operations comprising:
determining, by a database execution engine, a timing schedule to compute a second subset of results following computation of a first subset of results, the first subset of results comprising a first portion of data to satisfy a query, the second subset of results comprising a second portion of the data to satisfy the query, the determined timing schedule providing for use of a pause operation or a detach operation to compute the second subset of results, the pause operation waiting for a subsequent fetch request prior to computing the second subset of results, the detach operation asynchronously computing the second subset of results in a second thread different from a first thread used for the first subset of results;
computing, by the database execution engine and based on the pause operation or the detach operation determined by the timing schedule, the second subset of results; and
providing, by the database execution engine, the second subset of results.

12. The system of claim 11, wherein when the timing schedule indicates the database execution engine is handling a quantity of queries exceeding a threshold amount, the pause operation is selected, and wherein when the timing schedule indicates the database execution engine is handling a quantity of queries less than the threshold amount, the detach operation is selected.

13. The system of claim 11, further comprising:
receiving, by the database execution engine and from a client, the query comprising a request for the data, and wherein prior to computing the second subset of results, the operations further comprise:
computing, by the database execution engine, the first subset of results.

14. The system of claim 13 further comprising:
providing, by the database execution engine, the first subset of results.

15. The system of claim 14, wherein the second subset of results are computed during a time in which the first subset of results are provided to the client.

16. The system of claim 13, wherein the timing schedule is determined based on a timing requirement of the client.

17. The system of claim 11, wherein the timing schedule is determined based on a capacity of the database execution engine.

18. The system of claim 11, wherein the timing schedule is determined based on an amount of the data needed to satisfy the query.

19. The system of claim 11, wherein the second subset of results are computed in response to a client fetch request.

20. A non-transitory computer-readable storage medium comprising at least one memory storing instructions which, when executed by at least one data processor, causes operations comprising:
determining, by a database execution engine, a timing schedule to compute a second subset of results following computation of a first subset of results, the first subset of results comprising a first portion of data to satisfy a query, the second subset of results comprising a second portion of the data to satisfy the query, the determined timing schedule providing for use of a pause operation or a detach operation to compute the second subset of results, the pause operation waiting for a subsequent fetch request prior to computing the second subset of results, the detach operation asynchronously computing the second subset of results in a second thread different from a first thread used for the first subset of results;
computing, by the database execution engine and based on the pause operation or the detach operation determined by the timing schedule, the second subset of results; and
providing, by the database execution engine, the second subset of results.

* * * * *